United States Patent Office 3,606,484
Patented Sept. 20, 1971

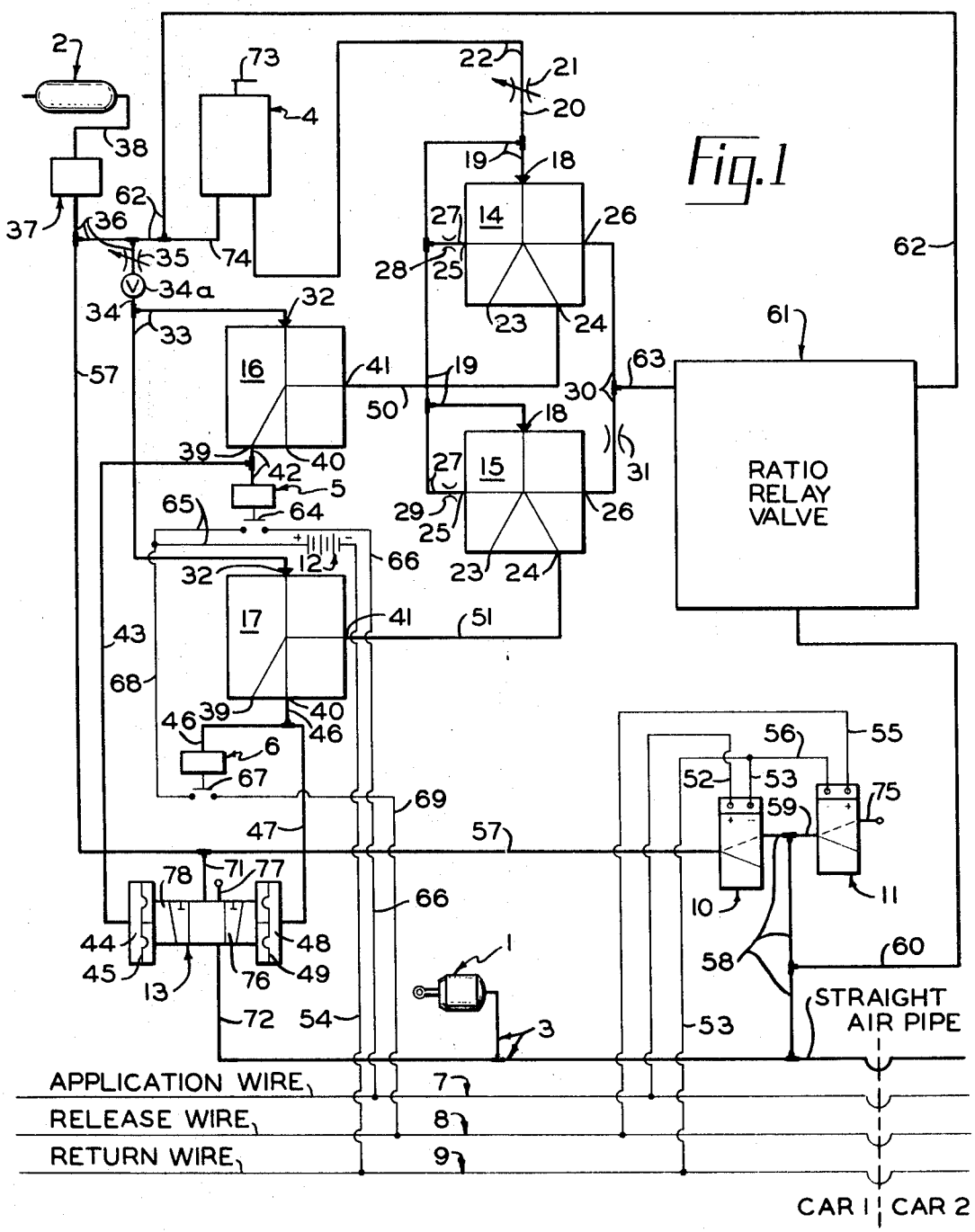

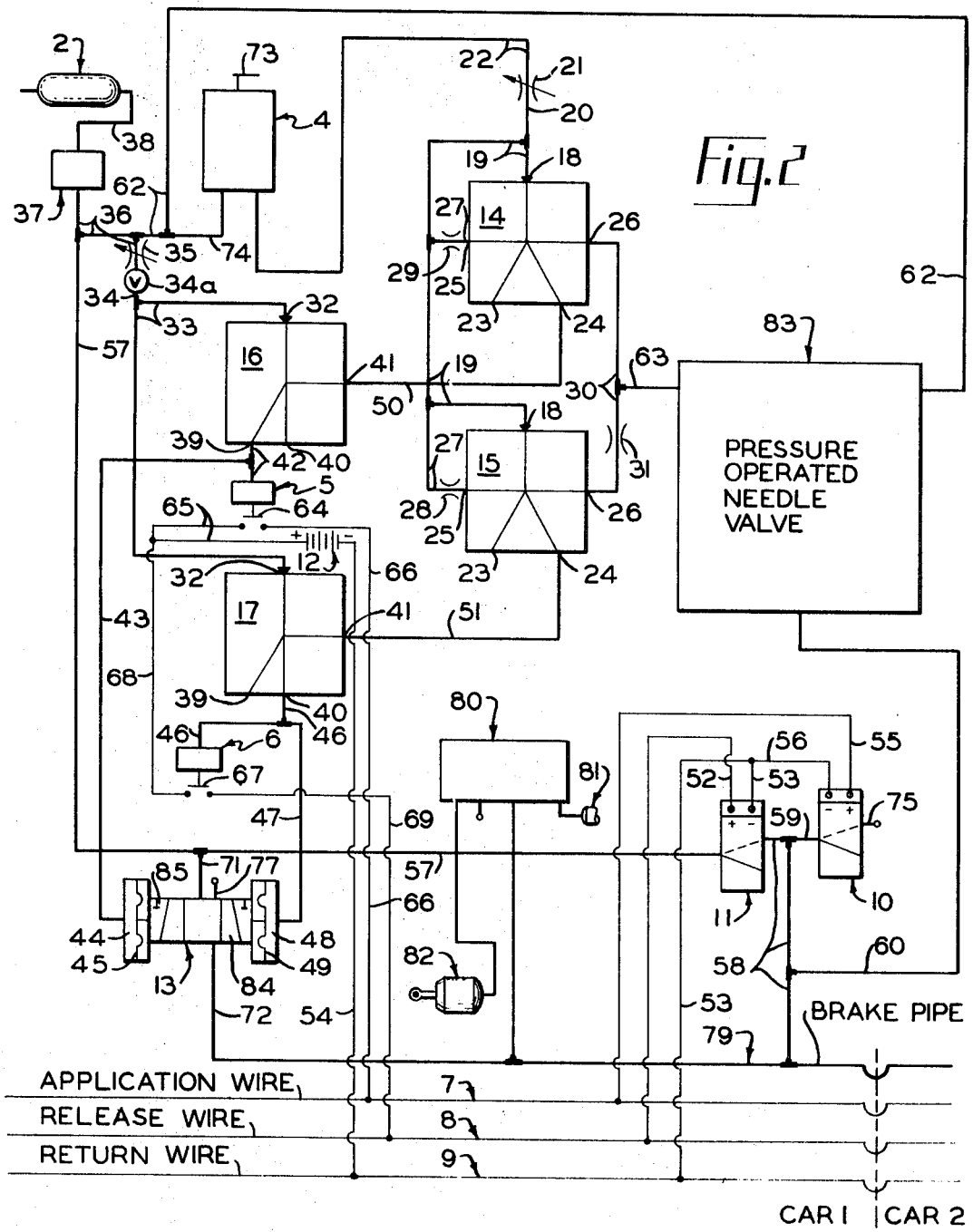

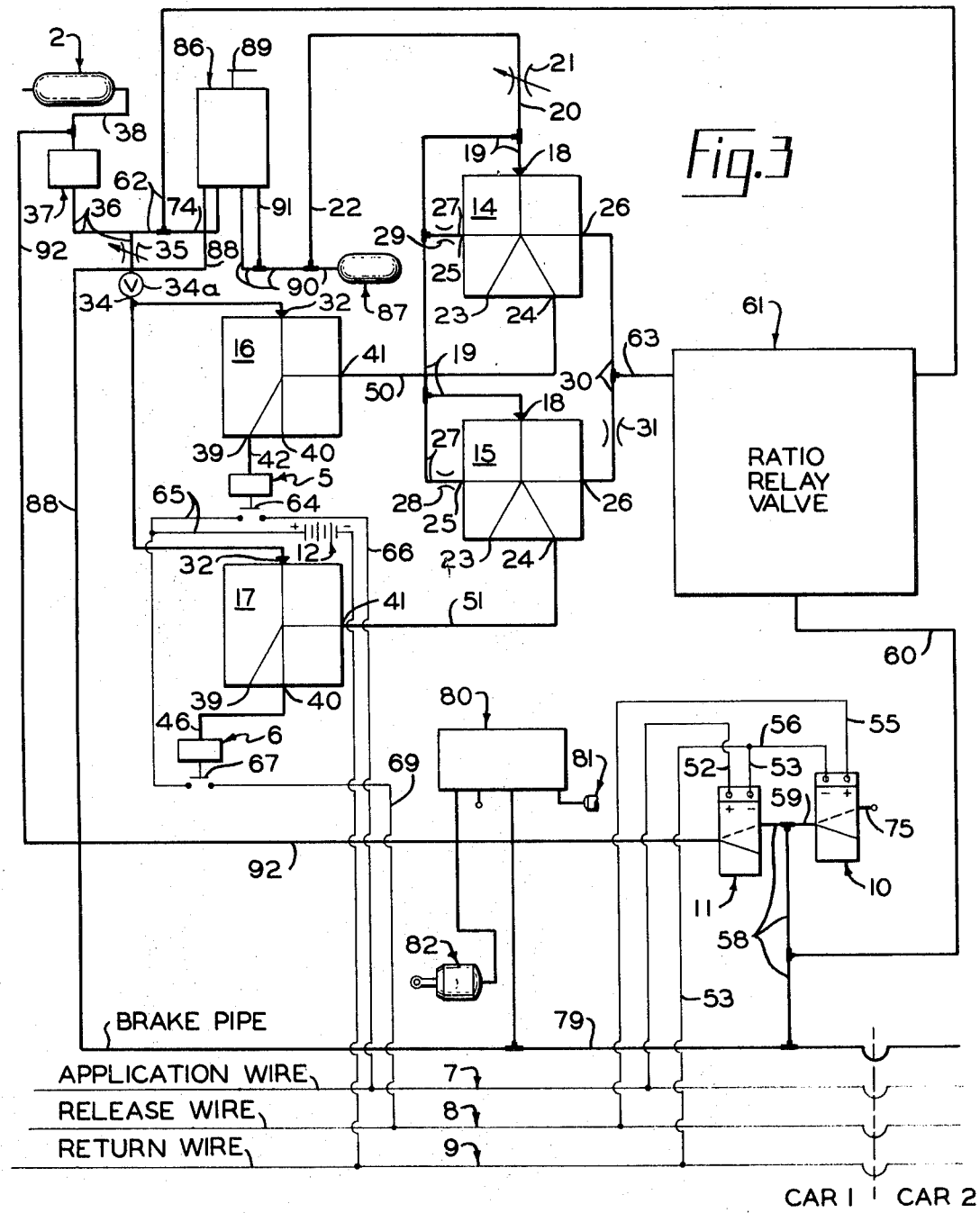

3,606,484
FLUIDIC CONTROL SYSTEM FOR VEHICLE BRAKES
Edward T. Dressler, Jr., Mars Estates, Essex, Md., assignor to Westinghouse Air Brake Company, Wilmerding, Pa.
Filed Jan. 2, 1970, Ser. No. 247
Int. Cl. B60t 13/68, 13/70
U.S. Cl. 303—20
23 Claims

ABSTRACT OF THE DISCLOSURE

An electro-pneumatic brake control apparatus for a train of self-propelled coupled cars, in which the pressure in a train line pipe is controlled by appropriate energization and deenergization of release and application magnet valve devices provided on each car in the train for supplying fluid under pressure locally to the train pipe or releasing fluid under pressure therefrom. The energization and deenergization of the magnet valve devices is controlled via train line wires by pneumatically operated switch devices on the lead car in the train. These switch devices are selectively operated by a plurality of pure fluid devices in correspondence to the operation of a brake valve also on the lead car to establish suitable control circuitry via the train line wires to the release and application magnet valve devices so as to cause either the charging of or a reduction of pressure in the train line pipe, it being understood that variations of the fluid pressure in the train line pipe are effective to control brake applications and brake releases on the cars in the train.

BACKGROUND OF THE INVENTION

Electro-pneumatic brake systems comprising pneumatically operated master controller switch devices for controlling the electrical train line wire circuits of electromagnet valves on the cars in the train so as to effect variations of pressure in the train line pipe have been known in the railway braking art for many years. Pat. 1,875,738 issued June 6, 1916, to Walter V. Turner and assigned to the assignee of the present application discloses such a system. However, this Turner patent merely discloses an electromagnet valve for releasing fluid under pressure from a train brake pipe without any electromagnet valve means for supplying fluid under pressure to the brake pipe for effecting the charging thereof to effect a brake release. Moreover, there are many forms and designs of fluid pressure operated master controller switch devices known in the braking art. However, it has been found that in actual practice these fluid pressure operated master controller switch devices tend to be sluggish in operation which causes undesirable arcing at and consequent pitting of their electrical contacts. This, in turn, has resulted in chattering of the magnet valves thereby causing rapid wear of the respective valves and their corresponding valve seats.

The above-mentioned sluggish operation of fluid pressure operated master controller switch devices results in overcasting of pressure changes and consequent pumping action until a balanced pressure condition is achieved. More specifically, the delayed opening of the contacts causes the reduction of the pressure in the train brake pipe and on one side of an abutment that operates the switch device to exceed, that is overcast, the reduction of the pressure previously manually effected, by operation of the brake valve device, in the equalizing reservoir and on the opposite side of this abutment. Such undesired overcasting thereafter causes undesired reclosing of the release contacts to effect energization of the release electromagnet valves which in turn cause the supply of fluid under pressure to the train brake pipe. This build-up of pressure in the train brake pipe results in an undesired partial relaase of the brake and also in an increase in the fluid pressure acting on the one side of the abutment thereby effecting reclosing of the application contacts whereupon the above-described cycle is repeated. This undesired cycling is termed pumping. Furthermore, brake pipe leakage reduces the fluid pressure on the one side of the abutment which in turn effects the respective operation of the master controller switch devices to maintain the desired pressure.

Accordingly, it is the general purpose of this invention to provide an improved electro-pneumatic brake control apparatus that includes a pair of fluidically operated fluid pressure switch devices for controlling respectively the energization and the deenergization of an application train wire and a release train wire extending through the cars in the train in a manner to minimize cycling or pumping action of these fluid pressure switch devices.

SUMMARY OF THE INVENTION

According to the present invention, energization and deenergization of an application and a release magnet valve device on each car in a train is effected via a corresponding one of a pair of train wires accordingly as one or the other of two fluid pressure operated switch devices is actuated by fluid under pressure supplied thereto and released therefrom by a corresponding number of pairs of pure fluid devices, one pair being operable in response to the manual operation of the handle of an engineer's self-lapping type of brake valve to effect the build-up of a desired degree of brake cylinder pressure to cause a corresponding braking force to be exerted on the cars in the train, and the other pair of pure fluid devices being operable in response to build-up of brake cylinder pressure to the desired degree to terminate further build-up of brake cylinder pressure. Accordingly, in response to closing of one fluid pressure switch device to cause energization of one magnet valve device on each car, the pressure in the train line pipe is varied in one direction to cause a pneumatic brake application on the cars in the train. Subsequent to deenergization of this one magnet valve device to discontinue the variation of pressure in the train line pipe, this brake application may be thereafter released in response to closing of the other fluid pressure switch device to cause energization of the other magnet valve device on each car, whereupon the pressure in the train line pipe is varied in a direction opposite the one direction to cause a release of the brake application on the cars in the train.

The electro-pneumatic brake control apparatus constituting the present invention embodies therein pneumatic valve means operable cojointly with the application and release magnet valve devices, and independently of these magnet valve devices should they become inoperative, to control variations of brake cylinder pressure and correspondingly the brakes on the cars in the train in case of malfunction of these magnet valve devices.

In the accompanying drawings:

FIG. 1 is a block and line diagram of an electro-pneumatic straight-air railway train brake system constituting a first embodiment of the invention.

FIG. 2 is a block and line diagram of a combined electropneumatic and pneumatic automatic railway train brake system constituting a second embodiment of the invention.

FIG. 3 is a block and line diagram of an electropneumatic automatic railway train brake system constituting a third embodiment of the invention.

Referring to FIG. 1 of the drawings, the electro-pneumatic straight-air railway rapid transit train brake system constituting the first embodiment of the invention comprises for each car in the train a brake cylinder 1, a main reservoir 2, a straight air pipe 3 that extends from one end of the first car and thence through all the cars in the train, an engineer's brake valve controller 4 which, for example, may be any suitable type of manually operable self-lapping valve device operative to control the operation of a fluid sensing circuit, hereinafter described in detail, which effects operation of a pair of fluid pressure operated switch devices 5 and 6 that control the energization and deenergization of an application train wire 7 and a release train wire 8 each extending through all the cars in the train, a return wire 9 also extending through all the cars in the train, and on each car an application magnet valve device 10 and a release magnet valve device 11 which are connected respectively between the application wire 7 and return wire 9, and between the release wire 8 and return wire 9.

Additional components of the electro-pneumatic straight-air railway train brake system mentioned above include on each car a source of electrical power which may be, such as, for example, a storage battery 12, and a double-diaphragm operated double-spring returned spool valve device 13 of any commercially available type.

The fluid sensing circuit which controls operation of the switch devices 5 and 6 comprise two bistable fluid amplifiers 14 and 15 operable sequentially, in response to manual operation of the engineer's brake valve controller 4, to effect the supply of fluid under pressure to these switch devices 5 and 6 via two fluidic OR/NOR gates 16 and 17 respectively, it being understood that these gates constitute parts of fluid sensing circuit.

Since the bistable fluid amplifiers 14 and 15 are identical, and likewise, the OR/NOR gates 16 and 17, a description of one of each of these devices will suffice for both, it being understood that the corresponding parts of each pair of devices are denoted by the same reference numerals.

Each of the bistable fluid amplifiers 14 and 15 is provided with a supply port 18. The supply ports 18 of the fluid amplifiers 14 and 15 are connected by a pipe 19 to which is connected intermediate the ends thereof one end of a short pipe 20 that has its opposite end connected to the outlet of a variable pressure regulator 21 which, for example, may be a manually adjustable needle valve device whereby this needle valve device provides a low pressure fluidic supply of fluid pressure to the fluid amplifiers 14 and 15. Connected to the inlet of the needle valve device 21 is one end of a pipe 22 that at its opposite end is connected to the outlet of the engineer's brake valve controller 4.

Each of the fluid amplifiers 14 and 15 further comprise a pair of outputs 23 and 24.

Output 23 of each fluid amplifier 14 and 15 is open to atmosphere.

Furthermore, each of the fluid amplifiers 14 and 15 is provided with a pair of control inputs 25 and 26 which, when selectively pressurized, effect pressurization of the corresponding outputs 24 and 23 respectively. By virtue of inherent memory, the bistable fluid amplifiers 14 and 15 will maintain the pressurized output in a pressurized condition even though the actuating one of the control inputs is thereafter depressurized, and until the other one of the control inputs is pressurized.

The control input 25 of each of the fluid amplifiers 14 and 15 is connected to the pipe 19 by a pipe 27. The pipe 27 leading to the control input 25 of amplifier 14 has disposed therein a choke 28 which insures that the pressure of the control fluid supplied to the control input 25 is less than the pressure of the fluid delivered to the supply port 18. The pipe 27 leading to the control input 25 of amplifier 15 has disposed therein a choke 29 the size of which is less than that of the choke 28.

The inputs 26 of the fluid amplifiers 14 and 15 are connected by a pipe 30 having a choke 31 therein, the purpose of the choke 31 being to provide for operation or switching of fluid amplifier 15 at a pressure that is less than the pressure at which the fluid amplifier 14 operates or switches.

Each of the OR/NOR gates 16 and 17 is provided with a supply port 32. The supply ports 32 of the OR/NOR gates 16 and 17 are connected by a pipe 33 to which is connected intermediate the ends thereof one end of a short pipe 34 that has its opposite end connected to the outlet of an adjustable needle valve device 35, which may be identical in construction to the hereinbefore-mentioned needle valve device 21, whereby this needle valve device provides a low pressure fluidic supply of fluid pressure to the supply ports 32 of the OR/NOR gates 16 and 17. Disposed in the pipe 34 is a normally open manually operable shut-off valve 34a for cutting off the supply of fluid under pressure to the supply ports 32 of OR/NOR gates 16 and 17 when desired. Connected to the inlet of the needle valve device 35 is one end of a pipe 36 that at its opposite end is connected to the delivery of a manually adjustable reducing valve device 37 provided on each car in the train. It will be understood that reducing valve devices, when used on self-propelled cars in a rapid transit train, are so adjusted that when their supply port is connected to a main reservoir in which the pressure therein may be, for example, one hundred and forty (140) pounds per square inch, a pressure of one hundred ten (110) pounds per square inch is provided at the delivery port and in the pipe connected thereto.

The supply port of the reducing valve device 37 is connected by a pipe 38 to the hereinbefore-mentioned main reservoir 2.

Each of the OR/NOR gates 16 and 17 comprises an OR output 39, a NOR output 40 and a single control input 41.

The OR output 39 of OR/NOR gate 16 is connected by a pipe 42 to the fluid pressure operated switch device 5 and the NOR output 40 of this gate is open to atmosphere.

Connected to the pipe 42 intermediate the ends thereof is one end of a pipe 43 that at its opposite end opens into a chamber 44 at the left-hand side of the left-hand diaphragm 45 of the hereinbefore-mentioned double-diaphragm operated double-spring returned spool valve device 13.

The OR output 39 of OR/NOR gate 17 is open to atmosphere and the NOR output 40 of this gate is connected by a pipe 46 to the fluid pressure operated switch device 6.

Connected to the pipe 46 intermediate the ends thereof is one end of a pipe 47 that at its opposite end opens into a chamber 48 at the right-hand side of the right-hand diaphragm 49 of the double-diaphragm operated double-spring returned spool valve device 13.

The single control inputs 41 of the OR/NOR gates 16 and 17 are connected to the outputs 24 of the respective bistable fluid amplifiers 14 and 15 by pipes 50 and 51.

It will be understood that each application magnet valve device 10 and each release magnet valve device 11 comprises a two-position valve, a spring for normally biasing the valve to a first position, and a solenoid having a plunger which, when the solenoid is energized, moves the two-position valve against the yielding resistance of the spring from its first position, to which it is biased by the spring while the solenoid is deenergized, to a second position.

It will be noted from FIG. 1 of the drawings that a positive terminal of a solenoid of each application magnet valve device 10 is connected by a wire 52 to the application train wire 7 and that a negative terminal of each of these solenoids is connected by a wire 53 to the return wire 9 which it will be understood is connected by a wire 54 to the negative terminal of the hereinbefore-mentioned storage battery 12.

As shown in FIG. 1, a positive terminal of the solenoid of each release magnet valve device 11, is connected by a wire 55 to the release train wire 8. A negative terminal of the solenoid of the release magnet valve device 11 on each car in the train is connected by a wire 56 to the hereinbefore-mentioned wire 53 intermediate the ends thereof, the wire 53 being connected to the return wire 9, as hereinbefore stated.

As shown in FIG. 1, in order for the application magnet valve device 10 on each car to effect the supply of fluid under pressure to the straight-air pipe 3, an inlet port of this valve device 10 is connected by a pipe 57 to the hereinbefore-mentioned pipe 36 intermediate the end thereof which pipe 36 is connected to the delivery port of the reducing valve device 37, and a delivery port of this valve device 10 is connected by a pipe 58 to the straight-air pipe 3.

In order for the release magnet valve device 11 to effect the release of fluid under pressure from the straight-air pipe 3 to atmosphere, an inlet port of the valve device 11 on each car in the train is connected by a pipe 59 to the pipe 58 intermediate the end thereof, and an outlet port of this valve device is open to atmosphere it being understood that communication between these inlet and outlet ports is closed except when the solenoid of the release valve device 11 is energized in a manner hereinafter explained. Likewise, the inlet port of the application magnet valve device 10 on each car in the train is closed to the delivery port and the pipe 58 except when the solenoid of these application valve devices 10 is energized in the manner hereinafter explained.

Connected to the pipe 58 intermediate the ends thereof is one end of a pipe 60 the opposite end of which opens into a chamber at one side of the smaller diaphragm of a double-diaphragm ratio relay valve device 61. The relay valve device 61 may be such as, for example, an H–22XT ratio relay valve device manufactured by the Conoflo Company.

The details of the double-diaphragm ratio relay valve device 61 are not shown, but may, for example, comprise two spaced-apart diaphragms of unequal effective area connected to a valve stem having at its end a supply valve for controlling the flow of fluid under pressure from a supply chamber to a delivery chamber. Opening into this supply chamber is one end of a pipe 62 that at its opposite end is connected to the pipe 36 intermediate the ends thereof. Consequently, this supply chamber is constantly supplied with fluid under pressure by the reducing valve device 37.

The delivery chamber of the ratio relay valve device 61 is connected by an internal passageway in this valve device to a chamber at one side of the larger of the two diaphragms of this valve device it being understood that fluid under pressure in this chamber acts on the effective area of the larger diaphragm in a direction that is opposite to the direction of the fluid pressure force acting on the effective area of the smaller diaphragm. Consequently, the supply valve is moved to its closed or lapped position when the supply or straight-air pressure acting on the effective area of the smaller diaphragm bears the same ratio to the delivery pressure acting on the effective area of the larger diaphgarm as the effective area of the larger diaphragm bears to the effective area of the smaller diaphragm.

Opening into the delivery chamber of the relay valve device 61 is one end of a pipe 63 that at its opposite end is connected to the pipe 30 intermediate the choke 31 therein and that end of the pipe 30 that is connected to the control input 26 of the bistable fluid amplifier 14.

From the foregoing it is apparent that the double-diaphragm ratio relay valve device 61 is operatively effective to supply fluid under pressure from the delivery port of the reducing valve device 37 to the control inputs 26 of the bistable fluid amplifiers 14 and 15 at a pressure that is proportional to the pressure in the straight air pipe 3 and brake cylinder 1, and is of such a low value as to provide for proper operation of these fluidic devices.

In the closed position of the switch device 5 its normally open contact 64 establishes a circuit between a wire 65 that is connected to the positive terminal of the hereinbefore-mentioned storage battery 12 and a wire 66 that is connected to the hereinbefore-mentioned application train wire 7 which is connected by the wire 52 to the positive terminal of the application magnet valve device 10.

In the closed position of the switch 6 its normally open contact 67 establishes a circuit between a wire 68 that is connected to the wire 65 which in turn is connected to the storage battery 12 as hereinbefore-mentioned, and a wire 69 that is connected to the release train wire 8 which is connected by a wire 55 to the positive terminal of the release magnet valve device 11.

It will be noted from FIG. 1 of the drawings that the pipe 57 is connected to the double-diaphragm operated double-spring returned spool valve device 13 by a pipe 71 in order that upon operation of this spool valve device 13 in the manner hereinafter described, fluid under pressure can be supplied from the outlet of the reducing valve device 37 via the pipes 36, 57 and 71 to a pipe 72 that at one end is connected to the outlet port of the spool valve device 13 and has its opposite end connected to the straight air pipe 3 intermediate the end thereof.

Operation FIG. 1

Let it be supposed that each car in a rapid transit train is provided with the brake control apparatus shown in FIG. 1 of the drawings. Let it be further supposed that the shut-off valves 34 on all cars except the lead car in the train are closed to thereby cut out operation of the OR/NOR gates 16 and 17 and the spool valve 13 on all the cars except the lead car from which brake applications and brake releases on the entire train are controlled by the engineer. Also, it will be understood that a handle 73 of the brake valve controller 4 on all cars in the train occupies its release position. To initially charge the brake apparatus shown in FIG. 1 of the drawing and provided on each car, an electric motor (not shown) is started for operating fluid compressors (not shown) to effect charging of the main reservoir 2 on each respective car from which fluid at a pressure determined by the setting of the reducing valve device 37, which for example, may be one hundred and ten (110) pounds per square inch as hereinbefore stated, flows via the pipes 36 and 57 to the application magnet valve device 10, and via the pipe 71 to the spool valve device 13. Furthermore, on the lead car only, fluid under pressure flows from the pipe 36 via the needle valve device 35, pipe 34 having therein open valve 34a and the pipe 33 to the supply port 32 of the OR/NOR gates 16 and 17 on the lead car. Also, on each car fluid under pressure flows from the pipe 36 via the pipe 62 to the inlet chamber of the double-diaphragm ratio relay valve device 61 and to the engineer's brake valve controller 4 via the pipe 62 and a pipe 74 connected at one end to the pipe 62 intermediate the ends thereof and at its opposite end to a supply chamber (not shown) in the engineer's brake valve controller 4.

It will be understood that while handle 73 of the engineer's brake valve controller 4 shown in FIG. 1 of the drawings occupies its release position in which it is shown, no fluid under pressure is supplied from the pipe 74, which is connected to the delivery port of the reducing valve device 37 via pipes 62 and 36, to the pipe 22.

It will be noted that on only the lead car in the train fluid under pressure flows from the delivery port of the reducing valve device 37 to the fluid pressure operated switch device 6 via pipe 36, needle valve device 35, pipe 34 having therein now open valve 34a, pipe 33, supply port 32 and NOR output 40 of OR/NOR gate 17 and pipe 46. Fluid under pressure thus supplied to the switch device 6 on the lead car operates its normally open contact 67 to closed position in which it establishes a circuit between the wire 68 that is connected to the positive terminal of the storage battery 12 via the wire 65 and the wire 69 that is connected to the release train wire 8. Since the solenoid of the release magnet valve device 11 on each car in the train is connected between the release train wire 8 and the return wire 9 (connected to the negative terminal of the battery 12 by wire 54) via the respective wires 55, 56 and 53, the solenoid of each of these release magnet valve devices 11 is now energized. When the solenoid of each release magnet valve device 11 is thus energized, the two-position valve of the respective magnet valve device 11 is moved from its first position to its second position.

When the two-position valve of each release magnet valve device 11 is moved to its second position, a communication is established between the pipe 59 and a pipe 75 connected at one end to the outlet port of the valve device 11 and at its other end open to atmosphere. Accordingly, it will be understood that the pressure chamber in the brake cylinder 1 on each car in the train is now open to atmosphere via the straight-air pipe 3, the respective pipes 58 and 59, the release magnet valve device 11 and the corresponding pipe 75 thus effecting a complete release of the brakes on all the cars in the train.

It should be noted that on the lead car only some of the fluid under pressure supplied to the pipe 46 in the manner explained above flows therefrom to the chamber 48 in the spool valve device 13 on this lead car via the pipe 47. At this time the chamber 44 in this spool valve device 13 is open to atmosphere via pipes 43 and 42, OR output 39 of corresponding OR/NOR gate 16 and NOR output 40 of this gate 16. Consequently, the fluid under pressure supplied to the chamber 48 is effective to deflect the diaphragm 49 in the direction of the left hand to move the spool valve 13 to a position denoted in FIG. 1 of the drawings by the numeral 76 in which one end of the pipe 72, that at its opposite end is connected to the straight-air pipe 3, is connected through the spool valve 13 to a pipe 77 that is open to atmosphere. Accordingly, it will be understood that the pressure chamber in the brake cylinder 1 on each car in the train is open to atmosphere via the straight-air pipe 3 and the spool valve device 13 on the lead car. Also, the release magnet valve device 11 on each car connects the corresponding brake cylinder 1 to atmosphere as aforestated.

Let it be supposed that the engineer desires to effect an electro-pneumatic straight-air brake application on the cars in the train. Now to manually effect an electro-pneumatic straight-air brake application on all the cars in the train, the engineer will move the handle 73 of the engineer's brake valve controller 4 on the lead car arcuately from its release position into an application zone (extending between release position and a full service position) an extent corresponding to the degree of brake application desired.

When the handle 73 of the brake valve controller 4 is moved into the application zone, the self-lapping control valve device of this controller 4 is operated to supply fluid under pressure from the outlet port of the reducing valve device 37 to the pipe 22 until the pressure in this pipe 22 is increased to a pressure corresponding to the degree of brake application desired.

As hereinbefore stated, the needle valve device 21 provides a low pressure fluidic supply of fluid pressure to the supply ports 18 of the bistable fluid amplifiers 14 and 15 via pipes 20 and 19. Some of the fluid under pressure supplied to the pipe 19 flows therefrom to the control inputs 25 of these fluid amplifiers 14 and 15 via the respective pipes 27 and chokes 28 and 29 therein, it being understood that the chokes 28 and 29 insure that the pressure of the fluid supplied to these control inputs 25 is less than that of the fluid supplied to the corresponding supply ports 18 in a manner typical of pure fluid amplifiers as is well-known in the art of fluid amplifiers. Accordingly, the fluid under pressure supplied to the control input 25 of these fluid amplifiers will cause the fluid under pressure supplied to the supply ports 18 thereof to flow to the outputs 24 of these amplifiers and thence via the respective pipes 50 and 51 to the control outputs 41 of the OR/NOR gates 16 and 17.

Since fluid under pressure is being supplied to the supply ports 32 of the OR/NOR gates 16 and 17 on the lead car from the outlet of the needle valve device 35, the fluid under pressure supplied to the control input 41 of each of these gates and cause these gates to switch from their one stable state to their other stable state in which the fluid under pressure supplied to the supply port 32 of each gate will flow to the OR output 39 of the respective gate.

Fluid under pressure will now flow from the switch device 6 to atmosphere via pipe 46, NOR output 40 or OR/NOR gate 17 and a vent (not shown) which is provided in this type of gate. When fluid under pressure is thus released from the switch device 6 to atmosphere, the contact 67 on this switch device moves to its open position thereby opening the power supply circuit to the release train wire 8 and therefore to the solenoid of the release magnet valve device 11 on each car in the train. Consequently, the solenoids of all of the release magnet valve devices 11 are deenergized whereupon a spring of each magnet valve device 11 moves the corresponding two position valve from its second position to its first position thereby cuting off pipes 59, 58, 60, the straight-air pipe 3 and the brake cylinders 1 on all cars in the train from atmosphere.

When the OR/NOR gate 16 on the lead switches to its other bistable state in the manner described above, the fluid under pressure supplied to its supply port 32 will flow therefrom to its OR output 39 and thence to the corresponding switch device 5 via the pipe 42.

This supply of fluid under pressure to the switch device 5 on the lead car operates its normally open contact 64 to its closed position in which it establishes a circuit between the wire 65 that is connected to the positive terminal of the battery 12 and the wire 66 that is connected to the application train wire 7 which in turn is connected to the solenoid of the application magnet valve device 10 on each car in the train via a wire 52, it being understood that these solenoids are connected to the negative terminal of the battery via the return train wire 9. When the solenoid of each application magnet valve device 10 is thus energized, the two-position valve of each magnet valve device 10 is moved from its first to its second position.

When the two-position valve of the application magnet valve device 10 on each car in the train is thus moved to its second position, a communication is established between the corresponding pipes 57 and 58 whereupon fluid under pressure will flow from the outlet of the reducing valve device 37 on the respective car to the corresponding brake cylinder 1 via pipes 36 and 57, the application magnet valve device 10, pipe 58 and the straight-air pipe 3. It may be noted that since the straight-air pipe 3 is connected between the cars, if the application magnet valve device 10 on any car in the train is defective, fluid under pressure will still be supplied to the brake cylinder 1 on the car having the defective valve device 10 and apply the brakes on this car.

It will also be noted that at the time fluid under pressure is released from the switch device 6 to atmosphere in the manner hereinbefore explained fluid under pressure is simultaneously released from the chamber 48 in the spool valve device 13 on the lead car to atmosphere via pipes 47 and 46 and the vent port in the OR/NOR gate 17.

It will be further noted that some of the fluid under pressure supplied to the pipe 42 in the manner described above flows therefrom to the chamber 44 in the spool valve device 13 on the lead car via the pipe 43. Upon this supply of fluid under pressure to the chamber 44, the spool valve device 13 is moved to the position denoted in FIG. 1 by the numeral 78 in which the pipe 71 is connected to the pipe 72. Fluid under pressure will now flow from the outlet port of the reducing valve device 37 to the straight-air pipe 3 via pipes 36, 57 and 71, the valve device 13 and the pipe 72.

From the foregoing it is apparent that the spool valve 13 on the lead car insures the supply of fluid under pressure to the straight-air pipe 3 and thence to the brake cylinder 1 on all the cars should there be an electrical power failure or a break in the circuit of the application magnet valve devices 10 so that these devices become inoperative.

It will be seen from FIG. 1 that some of the fluid under pressure supplied to the pipe 58 flows therefrom to the double-diaphragm ratio relay valve device 61 via the pipe 60. Consequently, this valve device 61 will be operated in the manner previously explained to effect the build-up of a correspondingly lower fluid pressure in the pipe 63.

Fluid under pressure thus supplied to the pipe 63 flows therefrom to the control inputs 26 of the bistable fluid amplifiers 14 and 15 via the pipe 30, it being noted that the choke 31 insures that the pressure of the fluid supplied to the control input 26 of the amplifier 15 is lower than the pressure of the fluid supplied to the control input 26 of amplifier 14. Consequently, the pressure at these control inputs 26 increase simultaneously as the pressure in the straight-air pipe 3 and brake cylinders 1 increase.

Accordingly, when the pressure at the control input 26 of the fluid amplifier 14 exceeds the pressure at the input 25 of this amplifier by a predetermined amount as governed by the inherent characteristics of this amplifier 14, this bistable fluid amplifier switches from its aforementioned one stable state to its other stable state in which the fluid under pressure supplied to the supply port 18 of this amplifier will flow to atmosphere via the corresponding output 23. Consequently, fluid under pressure is no longer supplied to the control input 41 of the OR/NOR gate 16. Therefore, this OR/NOR gate 16 will switch from its hereinbefore-mentioned other stable state to its hereinbefore-mentioned one stable state. In this one stable state of the gate 16, fluid under pressure will flow from its supply port 32 to atmosphere via its NOR port 40. Also, fluid under pressure will now flow from the chamber 44 in the double-diaphragm operated double-spring returned spool valve device 13 and the switch device 5 on the lead car to atmosphere via pipes 43 and 42, OR output 39 and NOR output 40 of gate 16.

When fluid under pressure is thus vented from the chamber 44, the spool valve 13 on the lead car is returned to its center position shown by its springs thereby terminating the supply of fluid under pressure from the outlet of the reducing valve device 37 to the straight-air pipe 3 and brake cylinders 1.

Likewise, when fluid under pressure is thus released from the switch device 5 on the lead car to atmosphere, the contact 64 of this switch device opens the power supply circuit to the solenoid of the application magnet valve device 10 on each car whereupon these solenoids are deenergized. When the solenoid of the application valve device 10 on each car in the train is thus deenergized, the two-position valve of each valve device 10 is moved by the corresponding spring from its second position to its first position to thereby close the hereinbefore-described communication between the corresponding reducing valve device 37 and the straight-air pipe 3 which is connected to the brake cylinders 1 thereby terminating further build-up of pressure in the brake cylinders on the several cars in the train.

The brakes on all the cars in the train are now applied to the degree corresponding to the position in its application zone to which the handle 73 of brake valve controller 4 was moved. Accordingly, the brakes on the train will remain applied so long as the handle 73 of the brake valve controller 4 remains in this position in its application zone.

The brakes on the entire train can be subsequently released by the engineer manually moving the handle 73 of controller 4 on the lead car out of the position it occupies in its application zone and back to its brake release position. As the handle 73 is thus moved to its brake release position, the self-lapping control valve device of the controller 4 is operated to release fluid under pressure from the pipes 22, 20 and 19 to atmosphere to thereby reduce the pressure at the control inputs 25 of the bistable fluid amplifiers 14 and 15. Likewise, the pressure at the output 23 of the fluid amplifier 14 and at the output 24 of the amplifier 15 will be reduced by flow of fluid under pressure from these outputs to atmosphere via the respective amplifiers, their supply ports 18, pipes 19 and 20, needle valve 21, pipe 22 and the controller 4. Accordingly, the pressure at the above-mentioned control inputs 25 and outputs 23 and 24 is reduced to atmospheric pressure.

When the pressure at the control input 25 of the fluid amplifier 15 is thus reduced a predetermined amount below the pressure at the control input 26 of this amplifier 15, which input 26 is supplied with fluid under pressure from the pipe 63 via the choke 31, the higher pressure at the control input 26 of the amplifier 15 causes this amplifier to switch from its one stable state to its other stable state in which fluid under pressure supplied to the supply port 18 in this amplifier 15 will flow to atmosphere via its output 23. Consequently, fluid under pressure is no longer supplied to the control input 41 of the OR/NOR gate 17 via pipe 51. Therefore, this OR/NOR gate 17 will switch from its other stable state to its one stable state in which fluid under pressure will flow from its supply port 32 to the pipes 46 and 47 via its NOR port 40.

Fluid under pressure thus supplied to the pipes 46 and 47 will flow respectively to the switch device 6 and the chamber 48 in the spool valve 13 on the lead car. Fluid under pressure thus supplied to the switch device 6 effects closing of its normally open contact 67 to establish the power supply circuit to the solenoid of each release magnet valve device 11. Accordingly it will be understood that the magnet valve device 11 on each car in the train is now operated to establish a communication between the corresponding pipes 59 and 75 for releasing fluid under pressure from the straight-air pipe 3 to atmosphere.

Fluid under pressure supplied the chamber 48 of the spool valve device 13 on the lead car in the train effects operation of this valve device to release fluid under pressure from the straight-air pipe 3 to atmosphere simultaneously as the release magnet valve device 11 on the several cars in the train operate to release fluid under pressure from the straight-air pipe 3. From the foregoing, it is apparent that fluid under pressure is quickly released from the brake cylinder 1 on each car in the train to atmosphere thereby releasing the brakes on all the cars in the train.

In FIG. 2 of the drawings, there is shown a combined electro-pneumatic and pneumatic automatic railway train brake system constructed in accordance with a second embodiment of the invention. According to this second embodiment of the invention, the electro-pneumatic brake equipment shown in FIG. 2 differs from that shown in FIG. 1 in that a pair of magnet valve devices and a spool valve device are provided on each car which may be operated under control of the engineer to control variations of pressure in a train brake pipe 79 that is connected to a pneumatically operated brake control valve 80 on each car rather than in a straight-air pipe. These brake control valves 80 are operable upon an increase in the pressure in the brake pipe 79 to a normal chosen pressure therein to effect a brake release and the charging of an auxiliary reservoir 81 to this normal chosen pressure, and operable upon a reduction from this normal chosen pressure to effect the supply of fluid under pressure from the auxiliary reservoir 81 to a brake cylinder 82 to cause a brake application on the respective car to a degree corresponding to this reduction. Accordingly, like reference numerals have been used to designate the structure shown in FIG. 2 which is identical to that shown in FIG. 1. Only such features of the structure and operation of the embodiment of the invention shown in FIG. 2 which differ from that of the embodiment of FIG. 1 will be hereinafter described.

According to the embodiment of the invention disclosed in FIG. 2, the combined electro-pneumatic and pneumatic automatic railway train brake system shown in this figure comprises for each car in the train the brake control valve 80 connected to the usual brake pipe 79, auxiliary reservoir 81 and brake cylinder 82, the engineer's brake valve controller 4, a fluid sensing circuit, the fluid pressure operated switch devices 5 and 6 that control energization and deenergization of the application train wire 7 and the release train wire 8 as in the first embodiment of the invention, the release wire 9, the application magnet valve device 10 connected between the application wire 7 and return wire 9 but operable to effect the release of fluid under pressure from the brake pipe 79 to atmosphere, and the release magnet valve device 11 connected between the release wire 8 and return wire 9 but operable to effect the supply of fluid under pressure from the outlet port of the corresponding reducing valve device 37 to the brake pipe 79.

The fluid sensing circuit shown in FIG. 2 is identical to the fluid sensing circuit shown in FIG. 1 except that the larger choke 28 is placed in the pipe 27 leading to the control input 25 of amplifier 15 and the smaller choke 29 is placed in the pipe 27 leading to the control input 25 of amplifier 14.

Additional components of the combined electro-pneumatic and pneumatic automatic railway train brake system shown in FIG. 2 include on each car the storage battery 12, the double-diaphragm double-spring returned spool valve device 13, and a fluid pressure operated needle valve device 83 in lieu of the double-diaphragm ratio relay valve device 61 shown in FIG. 1.

An inlet port of the needle valve device 83 is connected to the delivery port of the reducing valve device 37 by the pipes 62 and 36, and the outlet port of this valve device 83 is connected to the control inputs 26 of the fluid amplifiers 14 and 15 by the pipes 63 and 30. The needle valve device 83 may be of any commercially available type, and may comprise a needle valve (not shown) that is connected by a stem to a diaphragm (not shown) subject on the needle valve side to the force of a spring and on the opposite side to the pressure in the train brake pipe 79 since a chamber (not shown) at this opposite side is constantly supplied with fluid under pressure from brake pipe 79 via the pipes 58 and 60.

Operation FIG. 2

The initial charging of the main reservoir 2 shown in FIG. 2 may be the same as that for the main reservoir 2 shown in FIG. 1. Let it be supposed that the shut-off valves 34 on all cars except the lead car in the train are closed as in the first embodiment of the invention. Also, it will be understood that handle 73 on all cars occupies its release position. Consequently, fluid under pressure will flow to the reducing valve device 37 and thence to the spool valve device 13, the needle valve device 83, the engineer's brake valve controller 4 on each car, and to the supply ports 32 of the OR/NOR gates 16 and 17 on only the lead car. Fluid under pressure flows from the supply port 32 of gate 17 via this gate to the pressure switch device 6 and the chamber 48 in spool valve device 13 on the lead car in the manner explained for the first embodiment of the invention.

At this time, fluid under pressure is released from chamber 44 in spool valve 13 and switch device 5 via pipes 43 and 42, and OR output 39 and NOR output 40 of OR/NOR gate 16. Consequently, application magnet valve devices 10 are deenergized to close communication betwen the brake pipe 79 and atmosphere.

The fluid under pressure thus supplied to the switch device 6 shown in FIG. 2 is effective to establish the circuit for energizing the release train wire 8 and therefore, the release magnet valve device 11 on each car in the train since each of these devices is connected to the release train wire 8 by a corresponding wire 52. Accordingly, it will be understood that each release magnet valve device 11 now operates to effect the supply of fluid under pressure from the delivery port of the reducing valve device 37 on the corresponding car to the train brake pipe 79.

The fluid under pressure supplied to the chamber 48 in the spool valve device 13 on the lead car is effective to move this valve device against the yielding resistance of one of its springs to the position denoted in FIG. 2 of the drawing by the numeral 84 in which a communication is established between the pipes 71 and 72 whereupon fluid under pressure flows from the outlet port of the corresponding reducing valve 37 to the brake pipe 79 via pipes 36, 57 and 71, the spool valve device 13 and pipe 72. Consequently, the train brake pipe 79 will be charged to the pressure provided at the delivery port of the reducing valve devices 37 which pressure, as aforestated, may be one hundred and ten (110) pounds per square inch.

As fluid under pressure is thus supplied to the train brake pipe 79 by the release magnet valve devices 11 on the several cars in the train and by the spool valve device 13 on the lead car, the pressure in the train brake pipe 79 will increase to cause the brake control valves 80 on the several cars to effect a release of the brakes on these cars, and the supply of fluid under pressure from the train brake pipe 79 to the corresponding auxiliary reservoirs 81.

It will be noted from FIG. 2 of the drawings that fluid under pressure flows from the brake pipe 79 to the diaphragm chamber of the fluid pressure operated needle valve device 83 via the pipes 58 and 60. Consequently, as the pressure in the brake pipe 79 increases, this pressure acts on one side of the effective area of the diaphragm of the needle valve device 83 to deflect this diaphragm against the yielding resistance of the spring acting on the opposite side to move the needle valve toward its seat to thereby reduce the pressure in the pipes 63 and 30 and at the control inputs 26 of the fluid amplifiers 14 and 15, it being understood that when the pressure in the brake pipe 79 has increased to the normal charged pressure carried therein, which as aforesaid, may be for example one hundred and ten (110) pounds per square inch, the needle valve will be seated on its seat thereby cutting off flow of fluid under pressure from pipe 62 to the pipes 63 and 30. Accordingly, when the train brake pipe 79 is fully charged, no fluid under pressure will be supplied to the control inputs 26 of fluid amplifiers 14 and 15 and the pressure at these inputs 26 will be atmospheric.

Let it now be supposed that the engineer desires to effect a brake application on all the cars in the train. To do so he will move the handle 73 of the brake valve controller 4 on the lead car from its release position to a position in its application zone corresponding to the degree of brake application desired.

As the handle 73 is thus moved to the desired position in its application zone, the self-lapping valve device of controller 4 is operated thereby to establish a pressure corresponding to this position in the pipes 22, 20, 19 and 27 and therefore at the supply ports 18 and control inputs 25 of the fluid amplifiers 14 and 15.

It will be remembered that the pressure at control inputs 26 of amplifiers 14 and 15 is now atmospheric.

Since the choke 28 is larger than the choke 29, the bistable fluid amplifier 15 will operate prior to the amplifier 14 to cause the fluid under pressure supplied to its supply port 18 to flow to the corresponding output 24 or, in other words, the amplifier 15 will shift prior to the amplifier 14. Accordingly, when pressure at the control input 25 of the amplifier 15 is increased to the value required to cause the fluid under pressure supplied to the supply port 18 of this amplifier 50 flow to the output 24 of this amplifier, fluid under pressure will be supplied to the control input 41 of the OR/NOR gate 17.

This supply of fluid under pressure to the control input 41 of OR/NOR gate 17 on the lead car is effective to cause this gate to switch or operate in the manner hereinbefore described in detail in connection with the first embodiment of the invention to vent fluid under pressure from the corresponding switch device 6 and the chamber 48 in the spool valve device 13 to atmosphere.

As fluid under pressure is thus vented from the switch device 6, its contact 67 opens the power supply circuit to the release train wire 8 thereby effecting deenergization of the solenoid of the release magnet valve device 11 on each car in the train whereupon these devices 11 operate to close communication between the corresponding pipes 57 and 58 thus cutting off the delivery port of reducing valve device 37 on each car from the train brake pipe 79.

Likewise, as fluid under pressure is vented from the chamber 48 of the spool valve device 13 on the lead car, its springs return it to the position shown in FIG. 2 of the drawings, in which communication is closed between the pipes 71 and 72 thus cutting off the supply of fluid under pressure from the corresponding reducing valve device 37 to the train brake pipe 79.

When the pressure at the control input 25 of the amplifier 14 is increased to the value required to cause the fluid under pressure supplied to the supply port 18 of this amplifier to flow to the corresponding output 24, fluid under pressure will be supplied to the control input 41 of the OR/NOR gate 16.

Accordingly, OR/NOR gate 16 will now switch in the manner hereinbefore described to cause the fluid under pressure supplied to the supply port 32 of this gate 16 to flow to the corresponding OR output 39 and thence to the switch device 5 and chamber 44 in the spool valve 13 on the lead car in the train.

The switch device 5 will not operate to establish the power supply circuit to the application train wire 7 in the manner hereinbefore described whereupon the application magnet valve device 10 on each car will operate to release fluid under pressure from the brake pipe 79 to atmosphere.

Likewise, the spool valve device 13 on the lead car in the train will now be moved by the fluid under pressure acting in the chamber 44 on the diaphragm 45 to the position denoted in FIG. 2 by the numeral 85 in which the pipe 72 is connected to the pipe 77. Consequently, fluid under pressure will flow from the train brake pipe 79 to atmosphere via pipe 72, spool valve device 13 on the lead car and pipe 77 simultaneously as the application magnet valve device 10 on each car releases fluid under pressure from the train brake pipe 79 to atmosphere. Therefore, it will be noted that should there be a defect in the electrical circuit to the magnet valve device 10 on any or all cars, the spool valve device 13 on the lead car will insure the occurrence of a pneumatic brake application on all cars in the train since the brake control valve device 80 on each car is operative upon a reduction of pressure in the train brake pipe 79 to effect the supply of fluid under pressure from the corresponding auxiliary reservoir 81 to the brake cylinder 82 on the respective car to effect a brake application on this car to a degree corresponding to the degree of reduction of pressure effected in the train brake pipe 79.

Since the diaphragm chamber in the fluid pressure operated needle valve device 83 is connected to the brake pipe 79 via the pipes 60 and 58, the pressure in this chamber will be reduced simultaneously as the pressure in the brake pipe 79 is reduced. Accordingly, it will be understood that the spring acting on the needle valve side of the diaphragm of the valve device 83 moves the needle valve away from its seat as the pressure in the brake pipe 79 reduces. As this needle valve is thus opened, fluid under pressure will flow from the pipe 62 to the control inputs 26 of the fluid amplifiers 14 and 15 to increase the pressure at these control inputs.

Since the choke 31 is interposed between the pipe 63 and control input 26 of amplifier 15, the pressure at the control input 26 of amplifier 14 will increase faster than the pressure at control input 26 of amplifier 15. Accordingly, when the pressure at control input 26 of amplifier 14 exceeds the pressure at the control input 25 of this amplifier by a predetermined amount as governed by the inherent characteristics of this amplifier 14, this amplifier switches from its one stable state to its other stable state in which the fluid under pressure supplied to its supply port 18 will flow to atmosphere via the corresponding output 23. Consequently, the supply of fluid under pressure to the control input 41 of OR/NOR gate 16 is terminated. Therefore, this OR/NOR gate 16 will switch from its hereinbefore-mentioned other stable state to its hereinbefore-mentioned one stable state whereupon fluid under pressure will be vented from chamber 44 in the spool valve device 13 and from the switch device 5 on the lead car to atmosphere in the manner hereinbefore described. Accordingly, the spool valve 13 is returned to its center position and the contact 64 of switch device 5 opens to deenergize the solenoid of the magnet valve 10 on each car in the train thus terminating the release of fluid under pressure from the train brake pipe 79 to atmosphere.

Subsequent to terminating venting of fluid under pressure from the brake pipe 79 to atmosphere, the brake control valve 80 on each car in the train moves to its lap position to cut off further flow of fluid under pressure from the corresponding auxiliary reservoir 81 to the brake cylinder 82 on the respective car.

The brakes on all the cars in the train are now applied to the degree corresponding to the position in its application zone to which the handle 73 of brake valve controller 4 was moved.

The brakes on the entire train can now be released by the engineer manually moving the handle 73 back to its release position thereby causing the self-lapping valve device of the controller 4 to release fluid under pressure from the control inputs 26 of amplifiers 14 and 15 to atmosphere in the manner hereinbefore described until the pressure at these inputs 25 is reduced to atmospheric pressure.

When the pressure at control input 26 of amplifier 15 is thus reduced a predetermined amount below the pressure at the control input 26 of this amplifier, the higher pressure at input 26 causes this amplifier 15 to switch from its one stable state to its other stable state so that fluid under pressure will no longer be supplied to control input 41 of OR/NOR gate 17 via pipe 51. Accordingly, OR/NOR gate 17 will now switch from its other stable state to its one stable state in which fluid under pressure will flow through this gate 17 to the pressure switch device 6 and the chamber 48 in the spool valve 13 on the lead car.

The train brake pipe 79 will now be charged to the normal pressure carried therein and the brake control valve devices 80 on each car will operate in response to this charging of the brake pipe 79 to release the brakes on the respective car and effect recharging of the corresponding auxiliary reservoir 81 to the normal pressure carried in the brake pipe 79.

FIG. 3 of the drawings shows an electro-pneumatic automatic railway train brake system constructed in accordance with a third embodiment of the invention. According to this third embodiment of the invention, the electro-pneumatic automatic brake system shown in FIG. 3 differs from the combined electro-pneumatic and pneumatic automatic brake system shown in FIG. 2 in that the double-diaphragm double-spring returned spool valve is omitted, in that the engineer's brake valve controller 4 shown in FIGS. 1 and 2 is replaced by a self-lapping type of engineer's brake valve 86 such as that disclosed in U.S. Pat. 2,958,561, issued Nov. 1, 1960 to Harry C. May, and assigned to the assignee of the present application, in that the fluid pressure operated needle valve device 83 shown in FIG. 2 is replaced by the double-diaphragm ratio relay valve device 61 shown in FIG. 1, and in that the supply ports 18 and control inputs 25 of the bistable fluid amplifiers 14 and 15 of the fluid sensing circuit, which is otherwise identical to the fluid sensing circuit shown in FIG. 2, are subject to the pressure in an qualizing reservoir 87 associated with the engineer's brake valve 86. Accordingly, like reference numerals have been used to designate the structure shown in FIG. 3 which is identical to that shown in FIG. 2. Only such features of the structure and operation of the embodiment of the invention shown in FIG. 3 which differ from that of the embodiment of FIG. 2 will be hereinafter described.

As described in the above-mentioned Pat. 2,958,561, the engineer's brake valve 86 comprises a relay valve device operable to effect the supply of fluid under pressure from the outlet port of the reducing valve device 37 to the brake pipe 79 via the pipes 36, 62 and 74, and a pipe 88 that connects the delivery chamber of the relay valve device to the brake pipe 79, and a self-lapping control valve device operable upon movement of a handle 89 to its release position to effect charging of the equalizing reservoir 87 via a pipe 90 to a desired normal full charged value. In order that the relay valve device may effect charging of the brake pipe 79 to this same pressure, a pipe 91 connects the pipe 90 to a chamber (not shown) at one side of a diaphragm (not shown) of the relay valve device, it being understood that the equalizing reservoir pressure present in this chamber is effective to operate this relay valve device to supply fluid under pressure from the outlet port of the reducing valve device 37 to the brake pipe 79 and to a chamber (not shown) at the other side of this diaphragm until the pressure in this second chamber and the brake pipe 79 is substantially the same as that in the equalizing reservoir 87.

It can be seen from FIG. 3 that upon movement of the handle 89 on each car to its release position to effect charging of the equalizing reservoir 87 and the train brake pipe 79 to the desired normal pressure carried therein, a correspondingly lower pressure will be provided at the supply ports 18 and control inputs 25 of amplifiers 14 and 15. Consequently, since choke 28 is larger than choke 29, the amplifier 15 will be operated in the manner hereinbefore described to cause the OR/NOR gate 17 on the lead car to vent fluid under pressure from the corresponding switch device 6 which then opens the power supply circuit to the release train wire 8 thus de-energizing the solenoid of the application magnet valve device 10 on each car in the train whereupon these devices 10 operate to close communication between the corresponding pipes 59 and 75 thus cutting off the brake pipe 79 from atmosphere.

Subsequent to operation of amplifier 15 in the manner just described, the amplifier 14 will operate to supply fluid under pressure via the pipe 50 to the control input 41 of OR/NOR gate 16 to cause operation of this gate 16 on the lead car to effect the supply of fluid under pressure in the manner hereinbefore described to the corresponding pressure switch device 5. This supply of fluid under pressure to the switch device 5 effects closing of its contact 64 to thereby establish the power supply circuit to the application train wire 7 and therefore to the solenoid of the release magnet valve 11 on each car in the train. Accordingly, it will be understood that each release magnet valve device 11 will now operate to establish a communication between a pipe 92, connecting the inlet port of the valve device 11 to the pipe 38, and the pipe 58. Therefore, fluid under pressure will now flow from the main reservoir 2 on each car to the brake pipe 79.

It will be noted from FIG. 3 of the drawings that some of the fluid under pressure supplied to the pipe 58 and the brake pipe 79 flows to the double-diaphragm ratio relay valve device 61 via the pipe 60. Accordingly, this valve device 61 will operate in the manner hereinbefore described to effect build-up of a correspondingly lower pressure at the control inputs 26 of the amplifiers 14 and 15.

Accordingly, when the pressure at the control input 26 of amplifier 14 exceeds the pressure at the input 25 of this amplifier by a predetermined amount, this amplifier 14 switches in the manner hereinbefore described to cut off the supply of fluid under pressure to control input 41 of OR/NOR gate 16 which then operates to vent fluid under pressure from the switch device 5 to atmosphere via the pathway hereinbefore described.

When fluid under pressure is vented from switch device 5 on the lead car, the solenoid of the release magnet valve device 11 on each car is deenergized whereupon these devices 11 operated to cut off further flow of fluid under pressure to the brake pipe 79.

It will be understood that the effective areas of the diaphragms (not shown) of the double-diaphragm ratio relay valve device 61 are so selected as to provide the proper pressure at the control output 26 of amplifier 14 to cause this amplifier to switch when the desired normal fully charged pressure is obtained in the train brake pipe 79.

Assuming that the brake pipe 79 is charged to the pressure normally carried therein, and that the brakes on all the cars in the train are released, let it be supposed that the engineer desires to effect a brake application on all the cars in the train.

To effect a brake application on all the cars in the train, the engineer will move the handle 89 of the brake valve 86 on the lead car from its release position to a position in its application zone corresponding to the degree of brake application desired.

As the handle 89 is thus moved toward the desired position in its application zone, the control valve of the brake valve 86 is operated to effect a corresponding reduction of pressure in the equalizing reservoir 87, and at the supply ports 18 and control inputs 25 of fluid amplifiers 14 and 15.

When the pressure at the control input 25 of amplifier 15 is reduced a predetermined amount below the pressure at the corresponding control input 26, this amplifier will switch from its one stable state to its other stable state in which the fluid under pressure present at its supply port 18 will flow to atmosphere via the corresponding output 23.

Consequently, the supply of fluid under pressure to the control input 41 of OR/NOR gate 17 on the lead car is cut off whereupon this gate 17 switches to effect the supply of fluid under pressure therethrough to the switch device 6 thereby effecting closing of its contact 67.

As can be seen from FIG. 3, the closing of contact 67 of switch device 6 establishes the power supply circuit to the release train wire 8 and therefore, to the solenoid of the application magnet valve device 10 on each car in the train. Accordingly, these application magnet valve devices 10 on the several cars now operate to release fluid under pressure from the brake pipe 79 to atmosphere.

It will be noted that the relay valve of the brake valve 86 operates at this time to simultaneously release fluid under pressure from the brake pipe 79 to atmosphere.

Since the brake pipe 79 is connected to the brake control valve 80 on each car, each brake control valve 80 now operates in response to the reduction of pressure in the train brake pipe 79 to effect the supply of fluid under pressure from the corresponding auxiliary reservoir 81 to the brake cylinder 82 on the respective car to effect a brake application on this car.

As the pressure in the brake pipe 79 is reduced in the manner just explained, the ratio relay valve device 61 shown in FIG. 3 will operate in response to this reduction of pressure in the brake pipe 79 to effect a corresponding reduction of pressure at the control inputs 26 of the fluid amplifiers 14 and 15.

Consequently, when the pressure at the control input 26 of amplifier 15 is thus reduced below the value to which the pressure at the control input 25 of this amplifier was reduced by moving the handle 89 to a position in its application zone, the amplifier 15 will switch to effect the supply of fluid under pressure to control input 41 of OR/NOR gate 17 on the lead car.

Gate 17 now switches to vent fluid under pressure from switch device 6 to atmosphere whereupon its contact 67 opens thus deenergizing the solenoid of the magnet valve device 10 on each car to thus terminate venting of fluid under pressure from brake pipe 79. Brake control valve 80 on each car in the train will now move to its lap position thereby cutting off flow of fluid under pressure from the corresponding auxiliary reservoir 81 to the brake cylinder 82 on the respective car.

The engineer can now release the brakes on all cars in teh train by manually moving the handle 89 of brake valve 86 back to its release position. The relay valve device of brake valve 86 now supplies fluid under pressure to the brake pipe 79 via the pipe 88 to effect charging thereof.

Likewise, the control valve device of brake valve 86 now supplies air to the equalizing reservoir 87 and the supply ports 18 and control inputs 25 of fluid amplifiers 14 and 15 until the pressure in the equalizing reservoir 87 is increased to the desired normal pressure carried therein which pressure is determined by the setting of the control valve device.

This supply of fluid under pressure to the fluid amplifiers 14 and 15 will cause operation of the fluid sensing circuit, the switch devices 5 and 6 and the application and release magnet valve devices on the several cars in the train to effect the supply of fluid under pressure to the train brake pipe 79 simultaneously as fluid under pressure is supplied thereto by the relay valve device of the brake valve 86 until the brake pipe is charged to the normal pressure carried therein.

The brake control valves 80 on the several cars in the train operate in response to charging the brake pipe 79 to the normal pressure carried therein to effect a complete release of the brake on these cars.

Having now described the invention, what I claim as new and desire to secure by Letters Patent is:

1. In a brake control system for a train of cars having brake valve means for providing a variable pressure at a first output, a source of regulated fluid pressure, a train pipe, first circuit means including a first magnetic valve means operable to communicate said source of fluid pressure to said train pipe, and second circuit means including a second magnetic valve means operable to vent said train pipe, wherein the improvement comprises:
   (a) means for providing a fluid flow at a second output in accordance with pressure in said train pipe, and
   (b) pure fluid circuit means responsive to fluid pressure differential between said first output and said second output for providing different output conditions for controlling said first and said second circuit means to cause the pressure in said train pipe to follow pressure variations at said first output.

2. In a brake control system, as recited in claim 1, in which, said pure fluid circuit means comprises:
   (a) a pair of bistable fluid devices each having a supply port, a pair of outputs and a pair of control ports selectively pressurizable to pressurize a corresponding one of said pair of outputs,
   (b) said supply port and one of said pair of control ports of each of said pair of bistable pure fluid devices communicated with said first output, the other input of said pair of inputs of each of said pair of bistable devices communicated with said second output,
   (c) choke means disposed between said other input of one of said pair of bistable devices and said second output,
   (d) first pressure operated means responsive to pressurization of the output of said pair of outputs corresponding to said one of said pair of inputs of one of said pair of bistable pure fluid devices to operate said second circuit means, and
   (e) second pressure operated means responsive to pressurization of the output of said pair of outputs corresponding to said one of said pair of inputs of the other of said pair of bistable pure fluid devices to operate said first circuit means.

3. In a brake control system, as recited in claim 2, further including valve means operable in a first mode in response to pressurization of the output of said pair of outputs corresponding to said one of said pair of inputs of said one of said pair of bistable pure fluid devices to communicate said reservoir to said train pipe in by-pass of said second circuit means, and operable in a second mode in response to depressurization of said output of said pair of inputs of said other of said pair of bistable pure fluid devices to vent said train pipe in by-pass of said first circuit means.

4. In a brake control system, as recited in claim 1, further including an auxiliary train pipe pressure control means comprising fluid pressure responsive means responsive to said different output conditions of said pure fluid circuit means to selectively communicate said reservoir to said train pipe and vent said train pipe in by-pass of said first and said second circuit means.

5. In a brake control system, as recited in claim 1, said pure fluid circuit means comprising:
   (a) a pair of bistable pure fluid devices each having a supply port, a pair of outputs and a pair of inputs for selectively pressurizing a corresponding one of said pair of outputs,
   (b) a pair of pure fluid OR/NOR devices each having a supply port, an input, an OR output and a NOR output,
   (c) one of said pair of pure fluid devices having the supply port and one of said pair of inputs communicated with said first output the other of said inputs communicated with said second ouput, and the output of said pair of outputs corresponding to said one input communicated with said input of one of said pair of OR/NOR devices,
   (d) the other of said pair of pure fluid bistable devices having one of said pair of inputs communicated with said first output, the other of said pair of inputs communicated with said second output, and the one of said outputs corresponding to said one input communicated with said input of said second pure fluid OR/NOR device, and
   (e) choke means disposed between said second ouput and said other input of said other pure fluid bistable device.

6. In a brake control system, as recited in claim 5:
   (a) said first circuit means including a fluid pressure operated switch having an input communicated with the said NOR output of said other of said pair of pure fluid OR/NOR devices, and
   (b) said second circuit means including a fluid pressure operated switch communicated with said OR output of said one of said pair of pure fluid OR/NOR devices.

7. In a brake control apparatus, as recited in claim 6, further including an auxiliary train pipe pressure control system comprising means operable in a first mode in response to pressurization of said OR output of said one of said pair of pure fluid OR/NOR devices to communicate said reservoir directly to said train pipe, and operable in a second mode in response to pressurization of said NOR output of said other of said pair of pure fluid OR/NOR devices to directly vent said train pipe.

8. In a brake control system for a train of cars, brake control apparatus comprising the combination of:
   (a) a train pipe, variations of the pressure in which are effective to control brake applications and brake releases on the cars in the train,
   (b) a brake valve having:
      (i) regulating valve means operative to provide a variable pressure at an output, wherein the improvement comprises:

(c) a pure fluid circuit means comprising a pair of bistable fluid amplifiers and a pair of OR/NOR gates, (d) each of said pair of bistable fluid amplifiers having a pressure supply port, a pair of control pressure inputs and a pair of pressure outputs, the fluid pressure at said supply port, one of said control inputs and one of said outputs of said bistable fluid amplifiers being varied in accordance with the pressure provided in response to operation of said regulating valve means, and the fluid pressure at the other of said control inputs of said amplifiers being varied in accordance with variation of the pressure in said train pipe whereby, upon the pressure at said one control input exceeding the pressure at said other control input, fluid under pressure flows from said supply port to one of said outputs, and, upon the pressure at said other control input exceeding the pressure at said one control input, fluid under pressure flows from said supply port to the other of said outputs, (e) each of said OR/NOR gates having a pressure supply port, one control pressure input connected to the said one output of a different one of said bistable fluid amplifiers, and a pair of pressure outputs, the fluid pressure at said supply port and one or the other of said pressure outputs of said OR/NOR gates being constant and whereby, upon the supply of fluid under pressure to the one control pressure input of each OR/NOR gate, fluid under pressure flows from the supply port thereof to one of the corresponding pressure outputs, and upon termination of the supply of fluid under pressure to the respective one control pressure input, fluid under pressure flows from the supply port thereof to the other corresponding output, (f) electro-responsive valve means operative to effect the supply of fluid under pressure to and the release of fluid under pressure from said train pipe, (g) a pair of fluid pressure responsive switch devices, one of which is responsive to fluid under pressure supplied thereto from said one pressure output of one of said OR/NOR gates to establish a first circuit to said electro-responsive valve means to cause the operation thereof to effect the supply of fluid under pressure to said train pipe, and the other of which is responsive to fluid under pressure supplied thereto from said other pressure output of the other of said OR/NOR gates to establish a second circuit to said electro-responsive valve means to cause the operation thereof to effect the release of fluid under pressure from said train pipe.

9. In a brake control system for a train of cars, the combination as recited in claim 8, further characterized by, means operable in accordance with variations of pressure in said train pipe to provide a correspondingly lower pressure at said other of said control pressure inputs of said bistable fluid amplifiers.

10. In a brake control system for a train of cars, the combination as recited in claim 9, further characterized by means for insuring that the pressure at said other control pressure input of said one of said bistable fluid amplifiers is lower than the pressure at said other control pressure input of said other of said bistable fluid amplifiers.

11. In a brake control system for a train of cars, the combination recited in claim 8, further characterized by means for proving a constant chosen pressure at the supply ports of said OR/NOR gates.

12. In a brake control system for a train of cars, the combination as recited in claim 8, further characterized in that said electro-responsive valve means comprises for each car a pair of solenoid operated valve devices, one of which, when the solenoid thereof is energized, effects the supply of fluid under pressure to said train pipe, and the other of which, when the solenoid thereof is energized, effects the release of fluid under pressure from said train pipe to atmosphere.

13. In a brake control system for a train of cars, the combination as recited in claim 12, further characterized by a first circuit means interconnecting the solenoid of one of each pair of valve devices, and a second circuit means interconnecitng the solenoid of the other of each pair of valve devices.

14. In a brake control system for a train of cars, the combination as recited in claim 8, further characterized in that said train pipe comprises a straight-air pipe, an increase of pressure in which effects a brake application on the cars in the train, and a decrease of pressure in which effects a brake release on said cars.

15. In a brake control system for a train of cars, the combination as recited in claim 8, further characterized in that said train pipe comprises a brake pipe, an increase of pressure in which effects a brake release on the cars in the train, and a decrease of pressure in which effects a brake application on said cars.

16. In a brake control system for a train of cars, the combination as recited in claim 8, further characterized in that said brake valve has a handle manually movable from a release position into an application zone to effect operation of said valve means, and said valve means while said handle is in said release position provides a minimum pressure at said supply ports, said one control input and said one pressure output of said bistable fluid amplifiers, and while said handle is in a position at the end of said application zone opposite said release position provides a maximum fluid pressure at said supply ports, said one control input and said one pressure output of said bistable fluid amplifiers.

17. In a brake control system for a train of cars, the combination as recited in claim 8, further characterized in that said brake valve has a handle manually movable from a release position into an application zone to effect operation of said valve means, and said valve means while said handle is in said release position provides a maximum fluid pressure at said supply ports, said one control input and said one pressure output of said bistable fluid amplifiers, and while said handle is in the position at the end of said application zone opposite said release position provides a minimum fluid pressure at said supply ports, said one control input and said one pressure output of said bistable fluid amplifiers.

18. In a brake control system for a train of cars, the combination as recited in claim 17, further characterized in that said brake valve is operable to effect the supply of fluid under pressure to said train pipe simultaneously as said electro-responsive valve means effects the supply of fluid under pressure to said train pipe, and is operable to effect the release of fluid under pressure from said train pipe simultaneously as said electro-responsive valve means effects the release of fluid under pressure from said train pipe.

19. In a brake control system for a train of cars, the combination recited in claim 8, further characterized in that said train pipe comprises a brake pipe, and by means operable in accordance with an increase of pressure in said brake pipe to provide a correspondingly lower pressure at said other of said control pressure inputs of said bistable fluid amplifiers.

20. In a brake control system for a train of cars, the combination as recited in claim 8, further characterized by fluid pressure operated means operative independently of said electro-responsive valve means to effect the supply of fluid under pressure to and the release of fluid under pressure from said train pipe.

21. In a brake control system for a train of cars, the combination as recited in claim 20, further characterized in that one of said OR/NOR gates controls operation of said fluid pressure operated means to effect the supply of fluid under pressure to said train pipe, and the other of said OR/NOR gates controls operation of said fluid pressure operated means to effect the release of fluid under pressure from said train pipe.

22. In a brake control system for a train of cars, the combination receited in claim 20, further characterized in that one of said bistable fluid amplifiers and one of said OR/NOR gates operate cojointly to control simultaneous operation of said electro-responsive valve means and said fluid pressure operated means to effect the supply of fluid under pressure to said train pipe, and the other of said bistable fluid amplifiers and the other of said OR/NOR gates operate cojointly to control simultaneous operation of said electro-responsive valve means and said fluid pressure operated means to effect the release of fluid under pressure from said train pipe.

23. In a brake control system for a train of cars, the combination recited in claim 8, further characterized by valve means operative to cut-out operation of said pair of OR/NOR gates to effect the supply of fluid under pressure to said pair of switch devices.

References Cited

UNITED STATES PATENTS

| | | | |
|---|---|---|---|
| 1,251,596 | 1/1918 | Turner | 303—20 |
| 3,402,972 | 9/1968 | Cooper et al. | 303—20 |
| 3,432,210 | 3/1969 | Crouch | 303—20X |
| 3,490,814 | 1/1970 | Smith et al. | 303—20 |

MILTON BUCHLER, Primary Examiner

S. G. KUNIN, Assistant Examiner

U.S. Cl. X.R.

303—2, 22